Dec. 22, 1953  D. R. HOGIN  2,663,465
APPARATUS FOR HANDLING FINELY DIVIDED SOLID MATERIALS
Filed Oct. 27, 1949  2 Sheets-Sheet 1

David R. Hogin Inventor
By W.O. Tulman Attorney

Dec. 22, 1953     D. R. HOGIN     2,663,465
APPARATUS FOR HANDLING FINELY DIVIDED SOLID MATERIALS
Filed Oct. 27, 1949     2 Sheets-Sheet 2

David R. Hogin Inventor
By W. O. Tilman Attorney

Patented Dec. 22, 1953

2,663,465

UNITED STATES PATENT OFFICE 2,663,465

APPARATUS FOR HANDLING FINELY DIVIDED SOLID MATERIALS

David R. Hogin, Scarsdale, N. Y., assignor to Standard Oil Development Company, a corporation of Delaware Application October 27, 1949, Serial No. 123,859

3 Claims. (Cl. 222—368)

The present invention relates to apparatus for handling finely divided or granular solid materials, and more particularly to apparatus of such nature providing for the metering and controlled flow of such materials from one portion of a solids handling system to another.

In the handling of finely divided or of granular solid materials, particularly in pressurized systems, the metering and controlled flow of the solid materials from one zone to another in the system presents a difficult problem. Valves and other equipment such as star feeders, screw conveyors, and the like tend to become plugged by compacted masses of the finely divided solids, interfering with proper operation of the apparatus. In addition, where in such equipment, close mechanical clearances are required, the finely divided solids tend to create a serious problem of abrasion of closely spaced moving parts. It is an object of this invention to provide metering, or flow control apparatus in which the clearance between moving elements is generally sufficient to prevent bridging, plugging and abrasion, or in which access of the finely divided materials to the space between elements is effectively prevented. Abrasive action of the finely divided or granular solids is substantially eliminated by preventing contact between moving elements and the solid particles.

Figure 1:
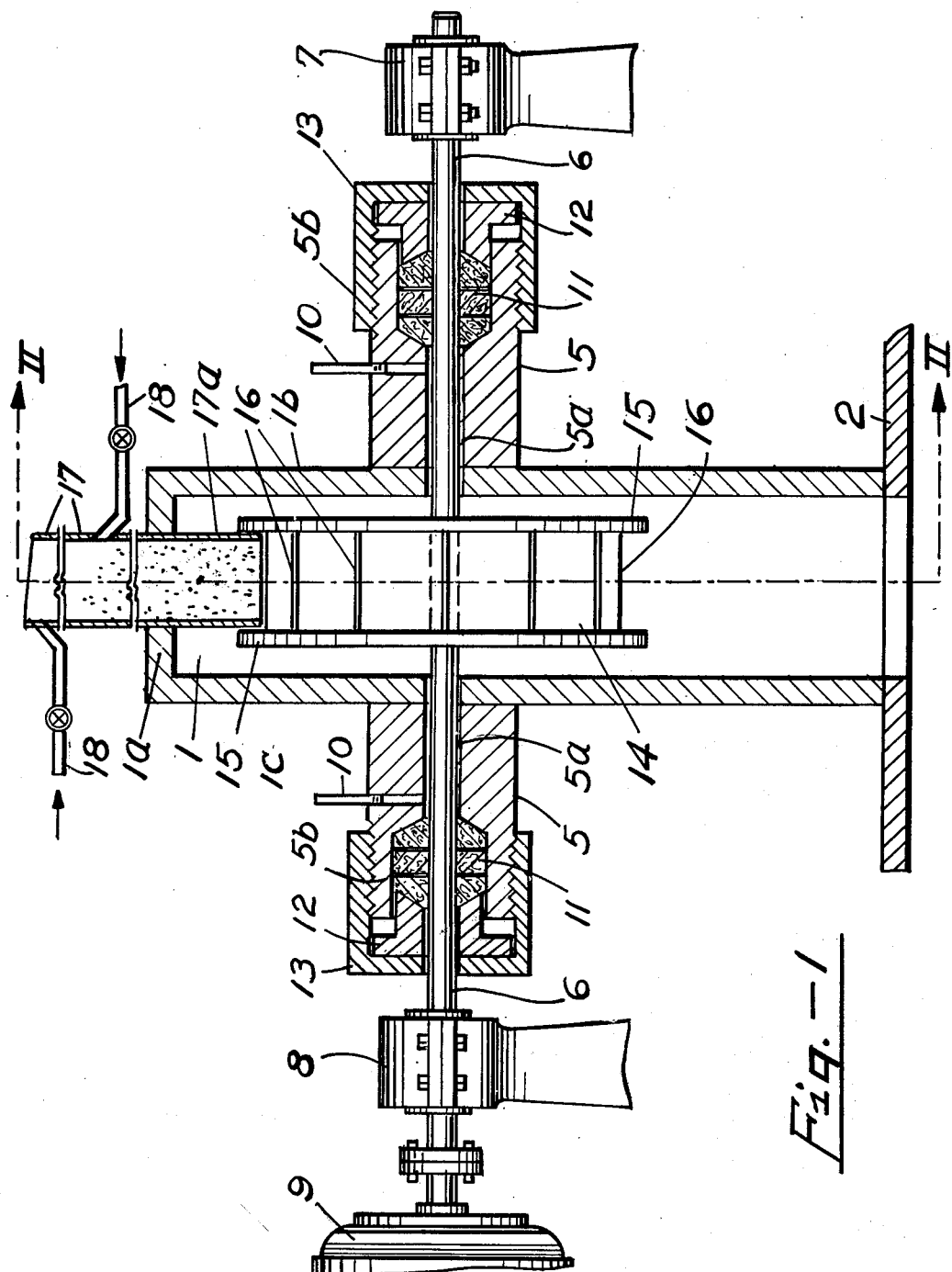
Figure 2:
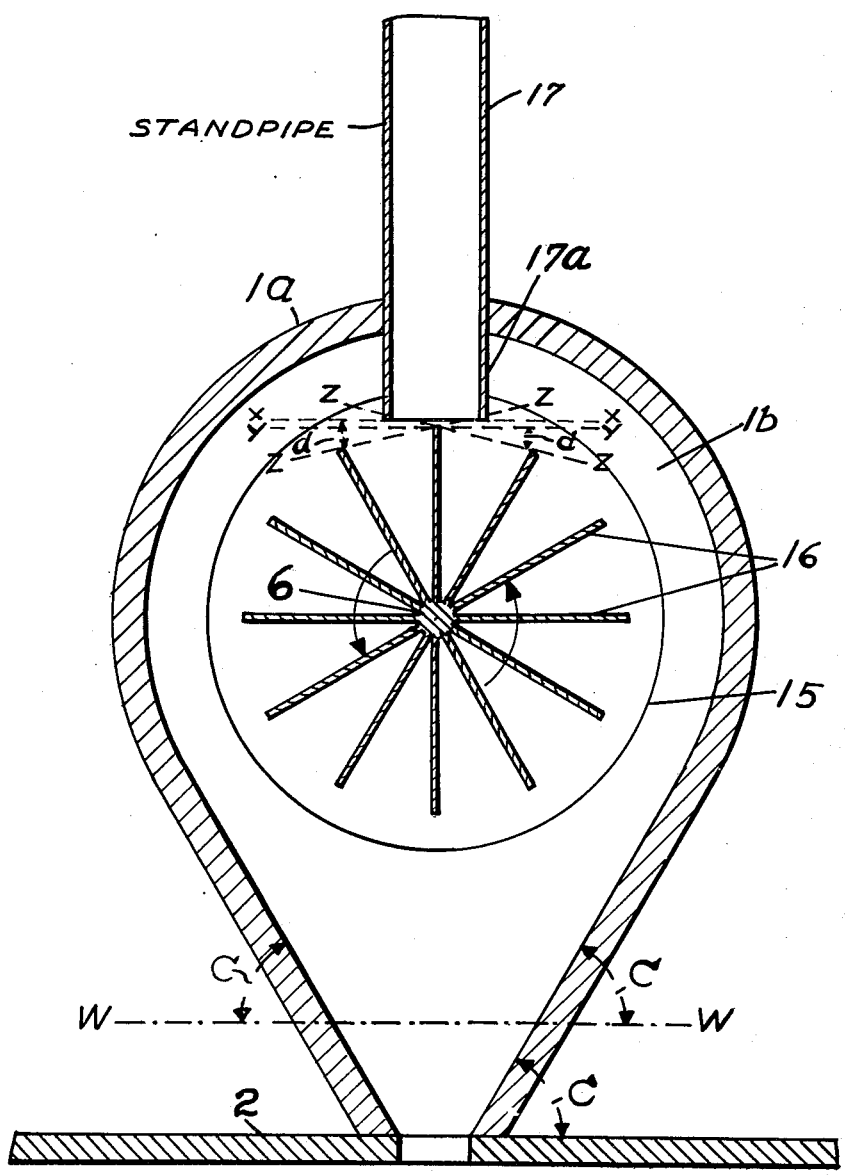

The invention and its objects may be more fully understood from the following specification when read in conjunction with the accompanying drawings, in which Fig. 1 is an end elevation of the apparatus in vertical section, and Fig. 2 is a vertical section through the apparatus according to Fig. 1 along the line II—II thereof.

Referring to the drawings in greater detail, the numeral 1 designates a housing or casing for the metering device, which, as shown, is composed of an end plate member 1a and side plate members 1b and 1c spaced one from another by means of the end plate member. The plate member 1a is circularly curved from a mid-point toward the respective end portions to form a substantially cylindrical upper portion for the casing, with the lower end portions of the plate 1a extending inwardly toward one another from opposite intermediate points, each forming a straight wall lower portion in which these walls are inclined or converge toward one another angularly, the inner wall surface of each wall portion intersecting a horizontal plane w—w through the casing at an angle c which is greater than the angle of repose for a finely divided solid material to be handled. The angular straight wall portions also have a substantially tangential relation to the curvature of the circular portion of the plate. Casing side plate elements 1b and 1c are shaped to fit and conform with the shape of the end wall portion as described. The lower end of the casing opens downwardly, communicating directly with a receiving vessel or a chamber 2.

Concentric with the upper circular portion of the casing, each side plate member supports gland members 5 exteriorly of the plates 1b and 1c, providing a shaftway 5a laterally of the casing and glands. The outer ends of the shaftway 5a through the gland members 5 are each provided with an enlarged shouldered portion 5b. A shaft 6 extends laterally through the glands 5 and the casing 1 supported at opposite end portions as by bearings 7 and 8 beyond the gland members 5. At one end of the shaft 6, a means for rotating the shaft is provided, which may be a motor 9 adapted for continuous or intermittent operation, or, under certain circumstances, may be merely a handwheel member. The shaft 6 and the shaftway 5a, including the portion extending through the side wall elements 1b and 1c, are provided for radially spaced relation one to another. Communicating with the annular space between the shaft and the shaftway walls, means such as conduits 10 are provided for the introduction of a pressurized fluid material through the wall of each gland member into the shaftway space and thence discharging into the casing. A packing material 11 disposed in the enlarged shouldered portions 5b is provided to seal the outer ends of the shaftway 5a and shaft 6 with relation to the gland member, the packing material 11 being compressed between the gland and the shaft as by means of compression elements 12 and cap nuts 13 threaded over the outer ends of the gland members 5.

Within the casing 1, concentric with the shaft 6 and the circularly shaped upper portion of the casing, is a rotor element 14 mounted on the shaft for rotation thereby. The rotor element 14 is composed of two circular side plate elements 15, disposed on the shaft in spaced parallel relation to each other and to the side plates 1b and 1c, separated and joined by a plurality of individual radial vanes 16. The vanes 16 are arranged in oppositely disposed pairs diametrically aligned with relation to the plate elements 15 and the shaft 6 and butted at their inner ends on said shaft. An even number of vanes is employed, providing an even number of sectoral compartments disposed as opposite pairs between the plates 15, with the apex angles of each pair in opposed relation diametrically of the shaft 6. The outer end or tip of each vane terminates in equal, radially spaced relation to the peripheral edges of the plate members 15. The rotor element 14 as such is of such dimensions as to provide a substantial free area between the peripheral edge portions of plate members 15, and the end plate member 1a as well as between the flat surface of the plates 15 and the side plate elements 1b and 1c of the casing 1.

A conduit element 17 is extended downwardly through the upper portion of the end plate 1a, and has a discharge end portion 17a which communicates with the casing above the rotor. The discharge end of the conduit has a diameter approximately equal to the lateral dimension of the vanes 16 and therefore the distance between plate elements 15. The discharge end enters the casing so as to be diametrically centered on the shaft 6, and terminates in a plane $x$—$x$, parallel to and in closely spaced relation to a horizontal plane $y$—$y$ which is tangential to the rotational arc of the outer ends of the vanes 16. The parallel spacing of the planes $x$—$x$ and $y$—$y$ will be determined by and not substantially less than the greatest dimension of the largest particle of the finely divided solids contained in the conduit 17. Although normally the discharge end 17a will have a circular cross-section, it may be oval or rectangular. In any event, however, the greatest diameter should not be longer than the distance between plate members 15, which is the width of vanes 16. Also, it is necessary that the conduit and vanes be disposed so as to prevent uncontrolled escape of solids from the conduit during intermediate stage of rotation of the rotor element 14 during which the sectoral compartments may not be in complete register with the conduit ends. For this purpose, the relationship between conduit and vanes should be such that a plane $z$—$z$ extended over the tips of any adjacent pair of vanes, and in contact therewith, will intersect the plane $x$—$x$ at an angle $d$, which angle is not greater than the angle of repose for the solids contained by the conduit, during that portion of the rotational arc of the rotor beginning substantially at that point in the arc at which the plane $z$—$z$ intersects the plane $x$—$x$ and one end edge portion of the conduit so as to form the angle $d$ exteriorly of the conduit, and continuing to that point at which the plane $z$—$z$ intersects the opposite edge of the conduit and the plane $x$—$x$ in the same fashion. This relationship normally should be accomplished when the tip of either the leading or the following vane of any pair is in substantially coincidental relation to the respective conduit end edge portions intersected by the plane $z$—$z$. As an angle of repose decreases, the required relationship may be retained by increasing the number of diametrically opposed pairs of vanes.

The conduit 17 may be connected to any source of supply for finely divided or granular solid materials, and may be a standpipe or elongated vertical member adapted to develop a fluistatic pressure head in a column of finely divided materials contained therein. Under such circumstances, means for aerating the column of finely divided solid materials in the conduit 17 may be provided such as valved lines 18 communicating with the conduit 17 for introducing a gaseous fluid material. Where such means are employed, however, it is essential that the lowermost line 18 be spaced from the discharge end 17a of the conduit at a distance sufficient to prevent direct passage of the gaseous fluid thus introduced downward into the casing 1, and to avoid hyper-fluidization of the solid materials immediately prior to discharge from the conduit.

In operation, solid materials enter the casing by way of the discharge end 17a of conduit 17, by gravity or under fluistatic pressure of the head of a column of such materials in the conduit, into the sectoral compartments opening upwardly immediately below the discharge end, filling the compartments. As the shaft and rotor are rotated, additional compartments are brought into filling register with the discharge end of the conduit. The materials entering the sectoral compartments from the conduit are spilled therefrom into the lower portion of the casing, and thence into the receiving vessel, by gravity during rotation of the rotor and shaft. As each compartment is filled, further flow of solids into the casing is prevented by intermittent plugging of the discharge end, until the shaft and rotor are advanced. The arrangement and arcuate spacing of the vanes with relation to the horizontal plane of the discharge end, as set forth above, are such as to prevent excessive slippage of the solid particles, thus preventing uncontrolled flow into the casing. The volume of each compartment and the number of compartments being known, the volume of solid materials delivered per revolution of the rotor is determinable by varying the speed of rotation of the element 14, and metered flow of solids from the conduit 17 into the vessel or chamber 2 is readily controlled. During operation, inert or process gas may be introduced through the lines 10 under a pressure sufficient to prevent entrance of solid particles into the shaftway 5a.

It has been found that various materials of the character contemplated may be handled efficiently by means of the apparatus set forth. For example, the apparatus was operated with a silica-alumina cracking catalyst having a particle size composition of:

| | |
|---|---|
| 6.2% | 0 to 20 microns. |
| 13.5% | 20 to 40 microns. |
| 26.2% | 40 to 80 microns. |
| 54.1% | 80+ microns. | without leakage of the catalyst material past the rotor, while maintaining a twenty-foot fluistatic head of the catalyst, equal to a pressure of about three pounds per square inch at the discharge end of the conduit. The device also was found to operate satisfactorily with other granular material such as sand of approximately 20 to 100 mesh fineness, and even with a coarse granular aluminum oxide material of from 8 to 10 mesh.

The apparatus, substantially as described, may be employed to meter and control the flow of finely divided solid material in any system handling such materials. No limitation on the delivery rate of such materials through the apparatus has been found, except as imposed by the capacity of the conduit 17 or the discharge rate therefrom. Suitable regulation of pressures applied to the material as passed through conduit 17 will permit operation under any desired pressure conditions in the receiving vessel, and by proper selection of materials for structural elements, including packing materials, the device may be employed substantially without regard for temperature conditions existing in the communicating parts of the system.

What is claimed is:

1. An apparatus for metering and controlling flow of finely divided solids from a conduit therefor, comprising a housing having upper and lower end portions, an outlet in said lower end portion, a conduit inlet extended into said housing through said upper end portion having a discharge end in opposed relation to said outlet and terminating in a first horizontal plane vertically spaced from said outlet, a rotatable shaft transversely of said housing intermediate said discharge end and said outlet parallel to said plane and diametrically of said end, a pair of circular plate members concentric with said shaft and secured thereto, said members spaced one from another longitudinally of said shaft by substantially the outside diameter of said conduit discharge end and extended radially from said shaft for a distance greater than the distance between said shaft and said first horizontal plane, a plurality of vane elements supported between said plate members and extending radially outwardly from said shaft to a distance substantially equal to the vertical distance from said shaft to a second horizontal plane below and in vertically spaced, close parallel relation to said first plane, the outer end edges of said vane elements terminating in radially spaced relation to the peripheral edges of said plate members, said vane elements and plate members forming a rotor unit rotatable with said shaft and providing a plurality of sectoral compartments opening outwardly between said plates, and in which said vane elements are so spaced arcuately that during rotation of said rotor unit a third plane extended over the outer end edges of any adjoining pair of vanes will intersect said first horizontal plane at an angle which is not greater than the angle of repose for a finely divided solid material contained by said inlet conduit from a point in the rotational arc of said rotor unit at which the line of intersection of said third and first planes is substantially coincident with one edge portion of the inlet conduit discharge end to a similar point at which the line of intersection of said planes is substantially coincident with the diametrically opposed edge portion of said end.

2. An apparatus according to claim 1 wherein said vane elements extend radially outwardly from said shaft to a distance substantially equal to the vertical distance from said shaft to a second horizontal plane below and parallel to said first plane, in which said second plane is vertically spaced from said first plane by a distance not substantially less than the greatest dimension of the largest particle of finely divided solids contained by said inlet conduit.

3. An apparatus according to claim 1 wherein said vane elements extend radially outwardly from said shaft to a distance substantially equal to the vertical distance from said shaft, to a second horizontal plane below and parallel to said first plane, in which said second plane is vertically spaced from said first plane by a distance not substantially less than 80 microns.

DAVID R. HOGIN.

References Cited in the file of this patent

UNITED STATES PATENTS

| Number | Name | Date |
|---|---|---|
| 183,684 | Klinkermann | Oct. 24, 1876 |
| 404,696 | Fee et al. | June 4, 1889 |
| 420,385 | Horan | Jan. 28, 1890 |
| 1,213,830 | Boon | Jan. 30, 1917 |
| 1,403,739 | Davidenia | Jan. 17, 1922 |
| 1,539,333 | Snyder | May 26, 1925 |
| 1,725,283 | Knittel | Aug. 20, 1929 |
| 2,011,133 | Yoss | Aug. 13, 1935 |
| 2,268,725 | Steel | Jan. 6, 1942 |